United States Patent [19]

Arnold et al.

[11] Patent Number: 5,349,594
[45] Date of Patent: Sep. 20, 1994

[54] INSULATIVE LASER SHELL COUPLER

[75] Inventors: Phillip A. Arnold; Andrew T. Anderson, both of Livermore; Terry W. Alger, Tracy, all of Calif.

[73] Assignee: The United States of America as represented by the United States Department of Energy, Washington, D.C.

[21] Appl. No.: 89,917

[22] Filed: Jul. 12, 1993

[51] Int. Cl.⁵ ............................................. H01S 3/03
[52] U.S. Cl. ................................... 372/62; 372/34; 372/35; 372/61
[58] Field of Search ..................... 372/34, 35, 61, 62

[56] References Cited

U.S. PATENT DOCUMENTS

| | | | |
|---|---|---|---|
| 4,719,638 | 1/1988 | Carlson et al. | 372/62 |
| 4,734,915 | 3/1988 | Mefferd et al. | 372/62 X |
| 5,175,738 | 12/1992 | Duncan | 372/35 |
| 5,177,761 | 1/1993 | Kaiser et al. | 372/62 X |

OTHER PUBLICATIONS

J. K. Mittal, "Design and Performance of a 20 Watt Copper Vapour Laser" *Jourl. of Phys. E.—Sci. Instr.,* vol. 21, pp. 388–392 (1988) (no month avail).
Shimon Gabay, et al., "Externally Heated Copper Vapor Laser for Parametric Studies" *IEEE Journal of Quantum Electronics,* vol. QE-18, No. 6, Jun. 1982, pp. 996–998.
O. Marazov, et al. "Performance of 10 W Sealed-Off Copper Vapour Laser" *JourPhys.E.,* vol. 17, #12, pp. 127–130, Aug. 1983.
Heon Hwang, et al., "Externally Heated Copper Vapour Laser Using A Carbon Heater" *Rev.Sci.Instrum.* 58 (7), Jul 1987, pp. 1185–1187.

*Primary Examiner*—Rodney B. Bovernick
*Assistant Examiner*—Hemang Sanghavi
*Attorney, Agent, or Firm*—Niguel A. Valdes; Roger S. Gaither; William R. Moser

[57] ABSTRACT

A segmented coaxial laser shell assembly having at least two water jacket sections, two pairs of interconnection half rings, a dialectric break ring, and a pair of threaded ring sections. Each water jacket section with an inner tubular section that defines an inner laser cavity with water paths adjacent to at least a portion of the exterior of the inner tubular section, and mating faces at the end of the water jacket section through which the inner laser cavity opens and which defines at least one water port therethrough in communication with the water jackets. The water paths also define in their external surface a circumferential notch set back from and in close proximity to the mating face. The dielectric break ring has selected thickness and is placed between, and in coaxial alignment with, the mating faces of two of the adjacent water jacket sections. The break ring also defines an inner laser cavity of the same size and shape as the inner laser cavity of the water jacket sections and at least one water passage through the break ring to communicate with at least one water port through the mating faces of the water jacket sections.

8 Claims, 3 Drawing Sheets

INSULATIVE LASER SHELL COUPLER

GOVERNMENT RIGHTS

The United States Government has rights in this invention pursuant to Contract No. W-7405-ENG-48 between the U. S. Department of Energy and the University of California.

FIELD OF THE INVENTION

The present invention is in the field of laser shell design, more specifically the design of voltage break/coupler interfaces with the laser shell.

BACKGROUND OF THE INVENTION

Voltage break/coupler assemblies are an integral part of the shell of a laser that operates at high voltage, typically tens of kilovolts, and at high average power. In order to operate successfully under these conditions, a segmented water jacket is employed for several reasons. One of those reasons is to provide cooling for the interior of the laser shell. The coupler in question is used to join segments of the water jacket which are at vastly different electrical potentials.

From an electrical standpoint, the break assembly must maintain voltage hold-off while allowing the inductance of the coaxial laser assembly to be minimized. This requires that all components of the coupler be dielectric materials and, furthermore, that the maximum diameter of the assembly be as small as possible. Mechanically, the couplers must be sufficiently strong to act as a structural member in a laser that is several meters long and weighs several hundred kilograms.

SUMMARY OF THE INVENTION

In accordance with the preferred embodiments of the present invention there is disclosed a segmented coaxial laser shell assembly having at least two water jacket sections, two pairs of interconnection half rings, a dielectric break ring, and a pair of threaded ring sections. Each water jacket section has an inner tubular section that defines an inner tubular laser path cavity with a water path adjacent to at least a portion of the exterior of the inner tubular section for conducting water therethrough, and mating faces at least on one end of the water jacket section through which the inner tubular laser path cavity opens and which defines at least one water port therethrough in communication with the water path. The water jacket also defines in the external surface a circumferential notch set back from and in close proximity to the mating face. The dielectric break ring has a selected thickness and is placed between, and in coaxial alignment with, the mating faces of two of the adjacent water jacket sections. The break ring also defines an inner tubular laser path cavity of the same size and shape as the inner tubular laser path cavity of the water jacket sections and at least one water passage through the break ring to communicate with the at least one water port through the mating faces of the water jacket sections. Additionally, a pair of the interconnection half rings mount within each of the external circumferential notches in the water jacket and interact, as described below, with the threaded ring sections to cause closure of the water jacket sections with the break ring. Finally, the threaded ring sections are a matched set, each with a threaded mating region that is to be captured by the threaded mating section of the other in the vicinity of and external to the break ring, to produce closure when an included shoulder of each of the threaded rings capture a different pair of the interconnection half rings when the pair of threaded rings sections are rotated in the engaging direction relative to each other.

Additional features of the present invention optionally include a current return as the outer most component of the assembly, a first groove surrounding each of the water ports in the mating faces of the water jacket sections to receive a first seal to abut against the side of the break ring to act as a water seal, and a second groove in the mating faces of the water jacket sections that surrounds and is spaced apart from the inner tubular laser path cavity to receive a second seal to abut against the side of the break ring to seal the laser cavity from external influences.

BRIEF DESCRIPTION

DETAILED DESCRIPTION OF THE PREFERRED EMBODIMENT

Figure 1A:
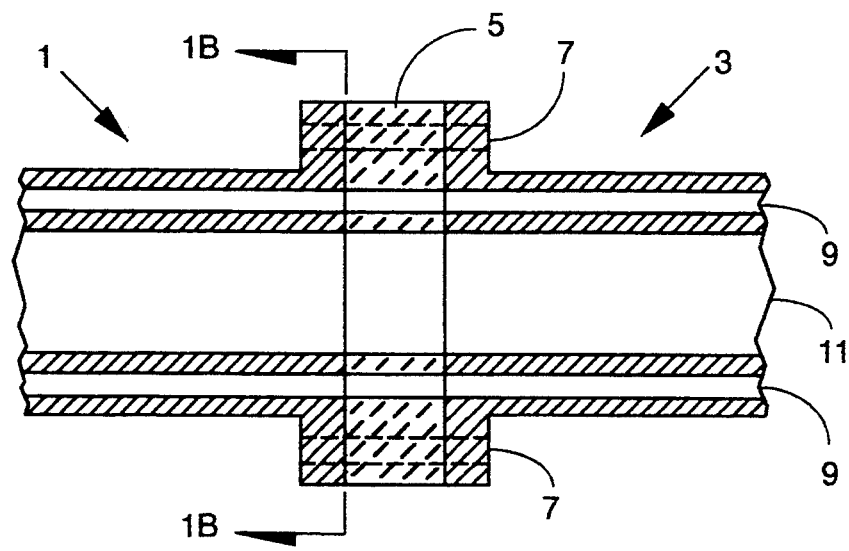
FIG. 1A is a longitudinal cross-section of the coaxial laser assembly of the prior art.
Figure 1B:
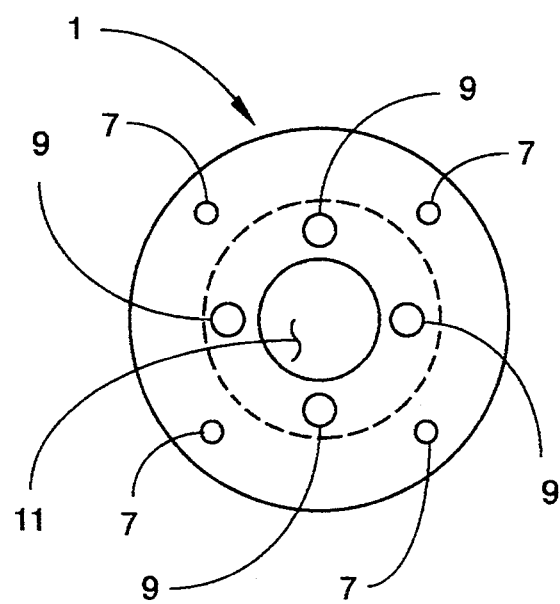
FIG. 1B is an end view of the flange end of one of the flange ended tubes of the coaxial laser assembly of the prior art as shown in FIG. 1A.

FIGS. 1A and 1B illustrate a laser shell with a voltage break assembly of the prior art. FIG. 1A is a longitudinal cross-section of the coaxial laser assembly of the prior art with a plastic (e.g. fiberglass epoxy) voltage break 5 between two flanged aluminum tubular sections 1 and 3. Figure 1B is an end view of the flange end of one of the flange ended tubes 1 and 3. This end view of the flange of either tube mates with plastic voltage break 5 which has a corresponding end configuration. A multiplicity of cooling passages were needed in this configuration to cool plastic voltage break 5 as well as tubular sections 1 and 3. FIGS. 1A and 1B further show the central opening 11 of the laser shell assembly, the cooling water passages 9 (only four are shown here for convenience), and bolt holes 7 for fastening a flanged end of tubes 1 and 3 together with a plastic voltage break therebetween by means of dielectric bolts (not shown).

Figure 2:
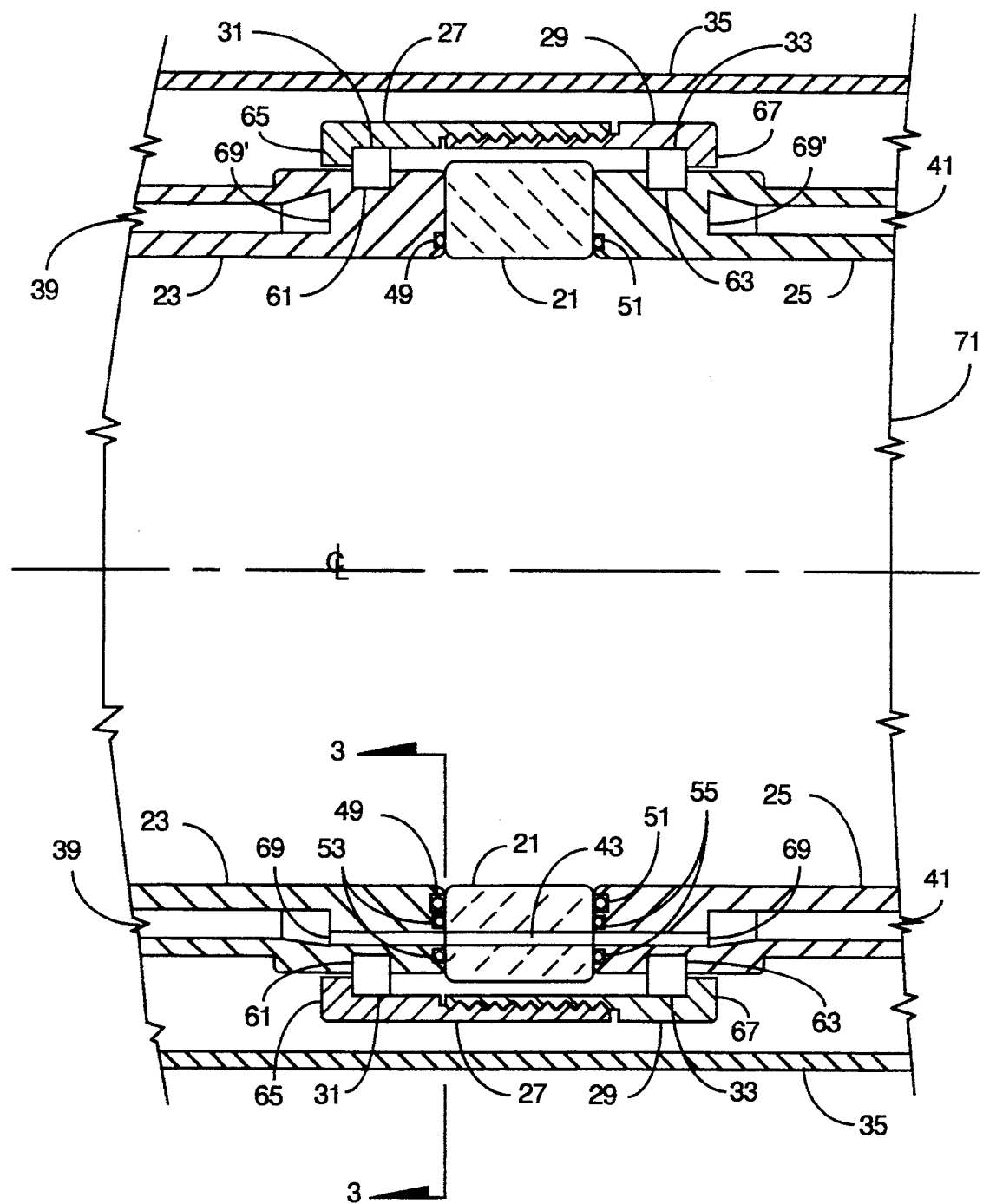
FIG. 2 is a longitudinal cross-section of the coaxial laser assembly of the present invention.
Figure 3:
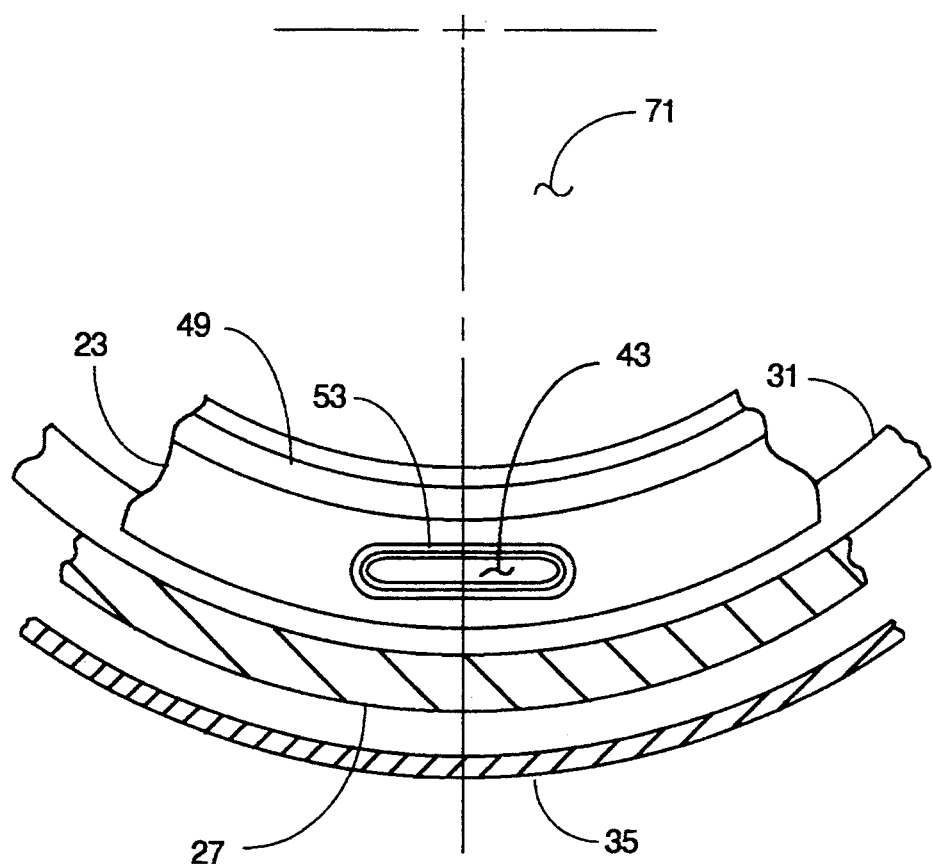
FIG. 3 is a partial end view of one of the tubes of the coaxial laser assembly of the present invention as shown in FIG. 2.

FIGS. 2 and 3 illustrate the voltage break/coupler assembly of a laser shell of the present invention. FIG. 2 is a longitudinal cross section of the laser shell in the vicinity of one of the breaks of the present invention, and FIG. 3 is a partial end view of the mating surface of one of the coaxial laser assembly tubes that mates with the coupler.

The laser shell assembly includes an outer tubular section 35 of a conductive material (e.g. aluminum since it is light in weight) to serve as the current return path and an inner water jacket that is spaced apart from the interior of the current return path 35, and a tubular inner cavity 71 through which the laser pulse is directed. At selected points along the length of the water jacket it is necessary to provide a voltage potential break.

FIG. 2 illustrates one of those breaks according to the design of the present invention. There is shown an insulative coupler ring 21 of a ceramic material sandwiched between two coaxially disposed annular water jacket members 23 and 25 such that the inner surface of insulative coupler ring 21 is coaxially aligned with the inner surfaces of each of the water jacket members 23 and 25. On the outer surface of each of the water jacket members 23 and 25 in close proximity to its mating face with ring 21 there is defined a notch or groove 61 and 63, respectively, each for receiving a pair of half rings 31 and 33, respectively, each of which encircles slightly less than half the full diameter of the associated water jacket at that point. Half rings are used to facilitate the insertion of same into notches 61 and 63 to provide closure between water jackets 23 and 25, and insulative coupler ring 21, threaded rings 27 and 29 are used. Threaded ring 27 has internally facing threads and threaded ring 29 has externally facing threads which are disposed to engage each other when these rings are placed around the exterior of water jackets 23 and 25 on either side of insulative coupler ring 21. As threaded rings 27 and 29 are engaged and advanced one onto the other, shoulders 65 and 67, respectively, come into contact with half rings 31 and 33 thus drawing water jackets 23 and 25 toward insulative coupler ring 21. Alternatively, each pair of half rings 31 and 33 could be replaced with a split ring which can be placed within notches 61 and 63 with a screwing motion.

Other features of the voltage break/coupler assembly of the present invention can best be seen by referring to both FIGS. 2 and 3. They include water passages 39 and 41 in water jackets 23 and 25, respectively. In FIG. 2 the water passages 39 and 41 are shown as being coaxial with inner cavity 71 and totally surrounding it, however, alternatively, the water passages could be one or a plurality of individual water tubes that are formed within water jackets 23 and 25 that are equally spaced around inner cavity 71. Regardless of which configuration is used for the water passages, the water passage(s) communicate with at least one water port 69. If there is more than one water port then they are evenly spaced around the mating surface of each water jacket for directing the flow of water through water port 39 and through insulative coupler ring 21 with the number of water ports being determined by the actual application. Surrounding each water port 69 in the mating face of each of water jackets 23 and 25 there is an "O"-ring 53 and 55 to act as a water seal with the mating faces of ring 21. There is also a pair of large diameter "O"-rings 49 and 51 in the mating face of each of water jackets 23 and 25 which encircle inner cavity 71 to further ensure that no water leaks occur into cavity 71 during operation of the laser.

Thus the design of the present invention avoids the externally protruding flanges of the prior art which adversely affect the laser characteristics. In this design the ceramic break 21 maintains the necessary separation between individual sections of the aluminum water jacket 23 and 25 with the large, threaded clamp rings 27 and 29 joining these pieces into a rigid assembly. Further, the selection of ceramic for break ring 21 also minimizes the cooling needed for break ring 21 during operation.

The design of the present invention has several advantages over the prior art. First, from a structural standpoint, the threaded area is quite large and the load on the clamps 27 and 29 is very low, so that plastic clamps can be used safely. Second, from an electrical point of view, the assembly is "low profile" (compared to the flanged joint of the prior art) and therefore allows the laser shell to have lower inductance. Third, the design permits the breaks to be in any axial location they are required, without the need to be located at an end flange that would allow access for dielectric bolts. Fourth, the ceramic break is cooled by conduction to the water jacket sections, obviating the need for a plurality of internal water channels in the break.

What is claimed is:

1. A segmented coaxial laser shell assembly comprising:
   at least two water jacket sections each having:
      an inner tubular section defining an inner tubular laser path cavity;
      water path means adjacent at least a portion of the exterior of said inner tubular section for conducting water therethrough;
      mating face means at least one end of said water jacket section through which said inner tubular laser path cavity opens and which defines at least one water port therethrough in communication with said water path means; and
      said water path means in the outer surface thereof defines a circumferential notch set back from and in close proximity to said mating face means;
   interconnection ring means for mounting within said external circumferential notch in said water path means of each of said two water jacket sections;
   a dielectric break ring of a selected thickness to be placed between and in coaxial alignment with said mating face means of two adjacent water jacket sections with break ring means, defining an inner tubular laser path cavity of the same size and shape as said inner tubular laser path cavity of said each two adjacent water jacket sections and at least one water passage through said break ring to communicate with said at least one water port through said mating face means of said two adjacent water jacket sections; and
   a pair of threaded ring sections each with a threaded mating region to be captured by the threaded mating section of the other of the pair of threaded ring sections in the vicinity and external to said break ring, each of said pair of threaded ring sections also including a shoulder for capturing said one of said pair of ring means within said notch in said water jacket means with said shoulders coming into contact with said pair of ring means as said pair of threaded rings sections are rotated in the engaging direction to bring and hold said break ring and two water jacket sections together.

2. A segmented coaxial laser shell assembly as in claim 1 further comprising a current return means that is the outer most component of the assembly.

3. A segmented coaxial laser shell assembly as in claim 1 wherein:
   said mating face means of each of said two water jacket sections defines a groove that surrounds each of said at least one water port; and
   said assembly further comprises sealing means for placement in said groove surrounding said water ports for abutting against the side of said break ring to act as a water seal.

4. A segmented coaxial laser shell assembly as in claim 1 wherein:
   said mating face means of each of said two water jacket sections defines a groove that surrounds and is spaced apart from said inner tubular laser path cavity; and said assembly further comprises sealing means for placement in said groove surrounding said inner tubular laser path cavity for abutting against the side of said break ring to seal said laser path cavity from external influences.

5. A segmented coaxial laser shell assembly comprising in combination:
  (a) at least two fluid jacket sections, each having:
    (i) an inner tubular section defining an inner tubular laser path cavity;
    (ii) a fluid path, adjacent to at least a portion of the exterior of said inner tubular section for conducting fluid therethrough; and
    (iii) mating face in at least one of said fluid jacket sections, through which said inner tubular laser path cavity opens, and which defines at least one fluid port therethrough in communication with said fluid path;
  (b) a dielectric break ring of a selected thickness to be placed between and in coaxial alignment with said mating face;
  (c) said break ring defining:
    (i) an inner tubular laser path cavity having a substantially similar size and shape as said inner tubular laser path cavity; and
    (ii) at least one fluid passage for communicating with said at least one fluid port through said mating face; and
  (d) a coupling for retaining said break ring and said at least two fluid jacket sections together.

6. The segmented coaxial laser shell assembly according to claim 5, wherein each fluid path defines a generally circumferential notch which is set back from and in close proximity to said mating face.

7. The segmented coaxial laser shell assembly according to claim 6, further including an interconnection ring mounted within each notch.

8. The segmented coaxial laser shell assembly according to claim 7, wherein said coupling includes a pair of threaded ring sections, each including a threaded mating region to be captured by the threaded mating section of the other of said pair of threaded ring sections, in the vicinity and external to said break ring.

* * * * *